Feb. 23, 1937. M. WINTERHALTER 2,071,603
METHOD OF MAKING SLIDE FASTENERS
Filed Aug. 15, 1933 2 Sheets-Sheet 2
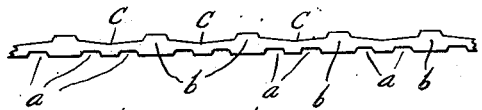
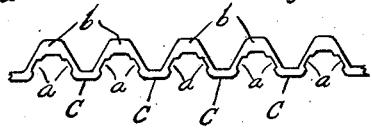
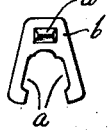
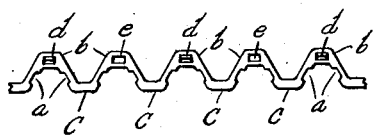
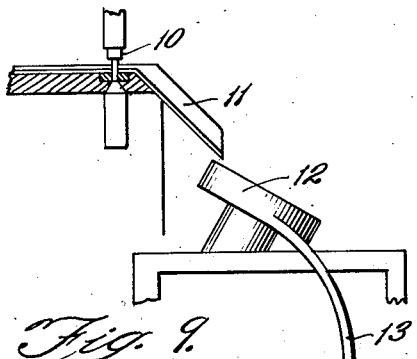
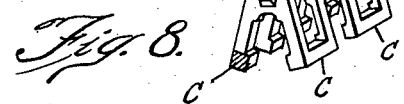
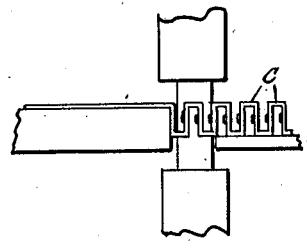
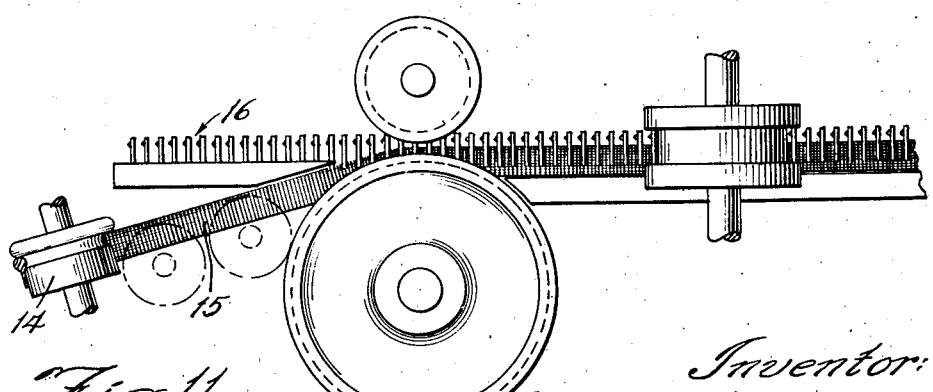
Inventor:
Martin Winterhalter
By Eugene M. Giles
Atty.

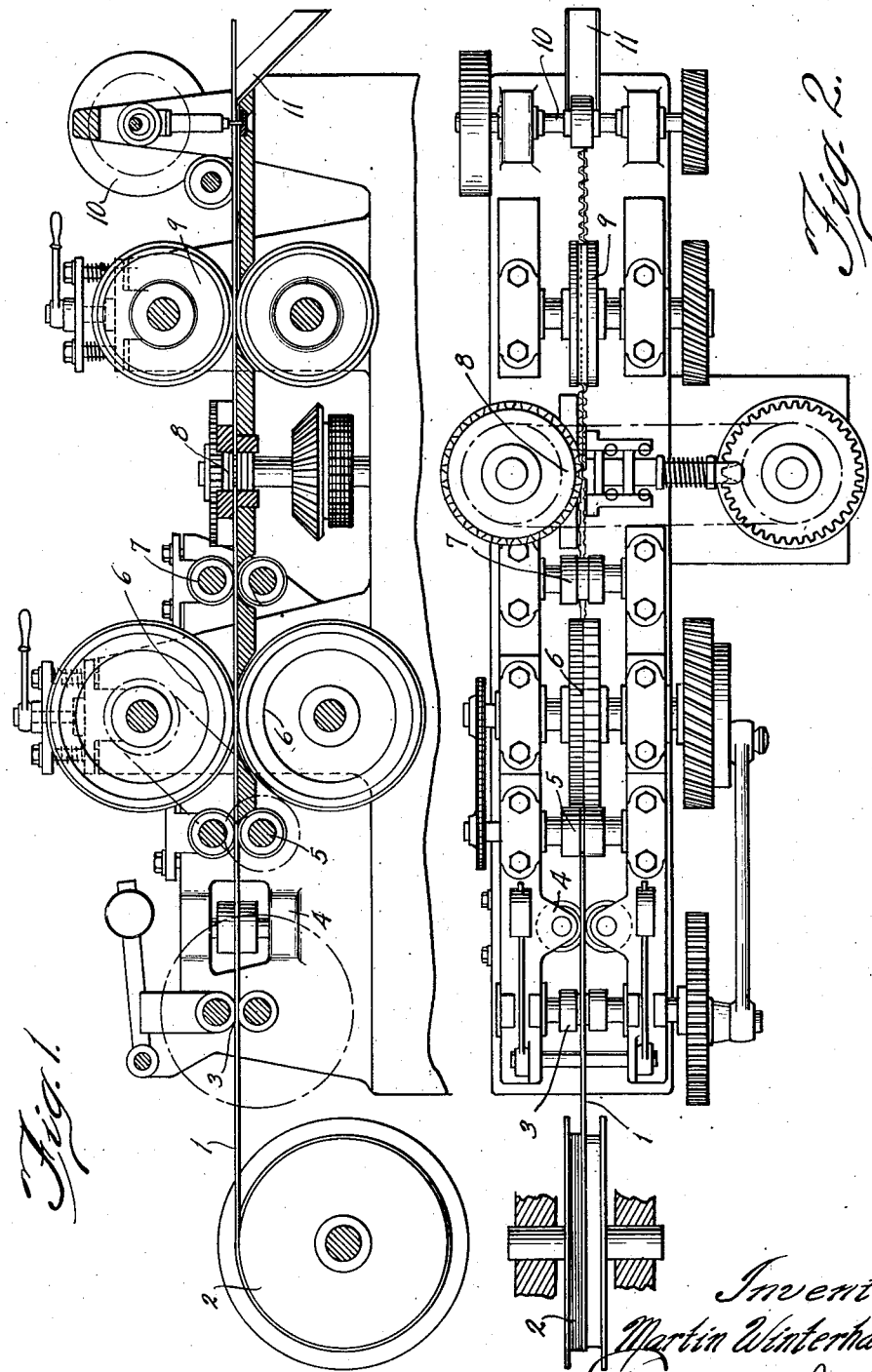

Patented Feb. 23, 1937

2,071,603

UNITED STATES PATENT OFFICE 2,071,603

METHOD OF MAKING SLIDE FASTENERS

Martin Winterhalter, Wuppertal, Wichlinghausen, Barmen, Germany

Application August 15, 1933, Serial No. 685,295
In Germany July 20, 1932

5 Claims. (Cl. 29—148)

My invention relates to slide fasteners wherein opposed series of fastener elements are adapted to be interlocked and released by movement of a slider therealong and has reference more particularly to the method of constructing such fastener elements in a connected series.

In slide fasteners of the type most extensively used, the elements are prepared individually or separately and have clamping jaws whereby they are secured in proper spaced relation on a stringer or other mounting. These elements are quite small and as considerable difficulty is experienced in handling the separate elements during the course of manufacture and in arranging them in proper relation for mounting, it is desirable to construct the elements so that they may be maintained in connected relation throughout the manufacturing operations. In some cases, as for example when the elements are to be subjected to a finishing treatment that cannot be performed properly in connected relation, it may be necessary to separate the connected fastener elements into individual elements, in which case they may be prepared in any convenient connected relation, but I prefer to prepare the elements so that they are connected in the same relation as to alignment and spacing which they are to have in the finished fastener so that they are ready for mounting without any rearrangement or relative adjustment,—these and other advantages being hereinafter accomplished with my present invention as explained hereinafter and illustrated in the accompanying drawings, in which,—

Fig. 1 is a vertical longitudinal sectional view of a machine for making fasteners in accordance with my invention;

Fig. 2 is a top or plan view of the machine;

Figs. 3, 4, 5, and 6 are side views of a length of material in successive stages of the fastener making operations;

Fig. 7 is a top view of a single fastener element and Fig. 8 a perspective view of a connected series of fastener elements constructed in accordance with my invention;

Fig. 9 a detail view of mechanism for separating a fastener element strip such as shown in Fig. 6 into individual elements and feeding same to the fastener applying mechanism;

Fig. 10 a fragmentary detail view of the mechanism for bending a fastener element strip such as shown in Fig. 6 into the form of a connected series of fastener elements as shown in Fig. 8 with the elements in the parallel spaced relation in which they are mounted; and Fig. 11 is a side view of mechanism for mounting the connected fastener of Fig. 8 on a tape or other support.

For the production of the fastener elements, wire is employed, which may have a square, round, oval or other cross section. This wire, which is indicated at 1 in Figs. 1 and 2, and a short section of which is shown in Fig. 3, is supplied from a spool 2 by a pair of feed rolls 3 and beyond the feed rolls 3 is passed through a straightening device 4 which straightens it out so that it is perfectly straight on all sides. The wire is then passed between another pair of feed rolls 5 to a pair of rotary forming members 6 which are designed to press and swage the wire into the form shown in Fig. 4 in which the portions $c$ remain unchanged in thickness while indentations are formed along the portions $a$ which subsequently become the legs of the fastener element and enlargements are provided at the portions $b$ which in the completed fastener become the coupling portions which interlock with corresponding portions of the opposed elements.

From the forming members 6 the wire, which is now in the form shown in Fig. 4, is passed between a pair of feed rolls 7 to the bending mechanism 8 which, by a lateral punching operation shapes the wire of Fig. 4 into the form shown in Fig. 5 in which each of the portions $b$ with the adjoining angular portions $a$ constitutes a fastener element and the portions $c$ are bridge members which connect the fastener elements.

After shaping into the form shown in Fig. 5 the strip of fastener elements is passed to the mechanism 9 which forms a projection $d$ on one side of each of the coupling portions $b$ and a corresponding recess $e$ on the other side, these projections and recesses being preferably arranged oppositely on successive elements as indicated in Fig. 6 in which the projection $d$ is shown on the first element at the left, the recess $e$ being on the other side and not shown, while on the next element the recess $e$ is shown, the projection $d$ being on the under side of that element and not shown and so on along the string of elements, this opposite arrangement of the projections and recesses on alternate elements being desirable so that in the event the strip of elements is bent into the form of a connected series as shown in Fig. 8 the projections $d$ will then be located on the corresponding sides of all the elements. If the strip of Fig. 6 is to be separated into individual elements it may have the projections and recesses arranged as above described or all the projections may be on one side and all the recesses on the other side of the strip. In either case it is merely necessary to cut away the bridge portions c that connect the successive elements so as to produce separate elements such as shown in Fig. 7, as for example by passing the strip of Fig. 6 from the projection and recess forming device 9 to a punch or cutter 10, and the separated elements may be delivered through a channel 11 to a device 12 for arranging and feeding the elements through a chute 13 to a mechanism for setting them on bands or tapes. The elements may, after they are separated by the cutter 10 and before they are supplied to the arranging and feeding device 12, be subjected to any treatment or operations that may be desired, such for example as polishing, nickeling, etc., and the sorting or arranging device 12 as well as the fastener setting mechanism (which is not shown) may be like those shown in my application Ser. No. 601,480 filed March 28, 1932 or of any other suitable type.

Instead of cutting the strip of Fig. 6 into the separate elements it may be bent as shown in Fig. 8 into the form of a connected series of fastener elements with the bridge portions c connecting and holding the adjoining elements in the same parallel spaced relation which they are to occupy in the completed fastener, it being noted that the bridge portions c are located alternately at opposite sides of the series of fasteners and that by arranging the projections d and recesses e oppositely on the successive elements as in Fig. 6 the projections d are at the same side of all the fastener elements when the strip is bent into the connected form of Fig. 8 and the recesses e are of course correspondingly arranged on the other side of all the elements of the connected series of fasteners of Fig. 8.

Any suitable mechanism may be employed for bending the strip of Fig. 6 into the form of Fig. 8 a stamping device being shown for this purpose in Fig. 10 which, in the machine of Figs. 1 and 2 may be substituted for the cutter that is indicated by the reference numeral 10 in these figures. The conveyer channel 11 may also be removed from the machine of Figs. 1 and 2 and the string of connected fasteners may be fed directly from the bending device of Fig. 10 to the setting mechanism of Fig. 11. In this setting mechanism a band or tape 15 on which the fastener elements are to be mounted is supplied from a spool 14 and fed obliquely up to a position in which the upper edge of the band or tape 15 is entered between the arms or jaws of the fastener elements of the connected series of fastener elements 16 (which are in the form shown in Fig. 8) and as the tape 15 and series of connected fasteners 16 proceed in this relation the arms or jaws of the fastener elements are pressed together so as to clamp the fastener elements on the edge of the tape 15. The parts c which connect the adjoining fastener elements may be cut away while the elements are being pressed on the tape or after the elements have been clamped onto the tape so that the completed fastener is of the customary type with separate elements, although if desired the connecting parts c may be left intact. A fastener of this character with the adjoining elements remaining connected may possess a lesser degree of flexibility than a fastener in which the elements are separated, but in many applications, as for example on some shoes, particularly low shoes, and certain other leather and rubber goods a high degree of flexibility is not required. In such cases quantities of connected fasteners as shown in Fig. 8 and without mounting on any tape or support may be furnished to the manufacturer of the goods who may cut them into the required lengths and readily set them directly onto the edges of the shoe or other article that is to be furnished with the fastener, this not only avoids the necessity of employing a special mounting tape and of attaching the tape to or building it into the edges of the article, but the presence of the connecting bridge provides additional clamping surface and the elements are thereby attached more securely to the article.

This new fastener can be produced very readily and cheaply as the wire runs steadily from the supply spool and it is possible in a given time to produce a larger number of fasteners than heretofore. After every bending operation and to a lesser degree after the swaging operation, the wire proceeds a little slower on account of the change of length that occurs as a result of such operations and the feeding rolls must, of course, be arranged to feed the wire at the slower rate after these operations.

While I have shown and described my invention in a preferred form, I am aware that various changes and modifications may be made therein without departing from the principles of my invention, the scope of which is to be determined by the appended claims.

I claim as my invention:

1. The herein described method of making multiple slide fasteners from a continuous wire blank which includes the steps of forming a series of regularly spaced projections along one side of the blank and two sets of regularly spaced projections along the opposite side of the blank with the projections of said sets disposed opposite and in alternation respectively with the projections of said series and in substantially the same plane therewith, then bending the wire blank portions between successive projections of said series to form a succession of spaced substantially U-shaped fastener members lying in substantially the same plane with the extremities of the adjacent legs of successive members connected by wire blank portions, then forming complementary lateral projections and recesses on opposite sides respectively of the U-shaped members, and then bending the blank portions which connect the successive U-shaped members to bring said members into substantial parallel planes.

2. The herein described method of making multiple slide fasteners from a continuous wire blank which includes the step of forming a series of projections along one side of the blank and two sets of projections along the opposite side of the blank with the projections thereof disposed opposite and in alternation respectively with the projections of said series, then bending the wire blank portions between successive projections of said series to form a succession of spaced substantially U-shaped fastener members with the extremities of the adjacent legs of successive members connected by wire blank portions, then forming complementary lateral projections and recesses on opposite sides respectively of the U-shaped members, and then bending the blank portions which connect the successive U-shaped members to bring said members into substantial parallel planes.

3. The herein described method of making multiple slide fasteners from a continuous wire blank which includes the steps of bending the wire blank into a succession of spaced substantially U-shaped fastener members lying in substantially the same plane with the extremities of the adjacent legs of successive members connected by wire blank portions, then forming complementary lateral projections and recesses on opposite sides respectively of the U-shaped members, and then bending the blank portions which connect the successive U-shaped members to bring said members into substantial parallel planes.

4. The herein described method of making multiple slide fasteners from a continuous wire blank which includes the steps of bending the wire blank into a series of substantially U-shaped fastener members lying in substantially the same plane with the extremities of the adjacent legs of successive members connected by wire blank portions, deforming the legs of said members into jaws for embracing and gripping a holder strip, forming complementary projections and recesses at opposite sides of the bends of the U-shaped members to make coupling parts thereof, and then bending the blank portions which connect the successive U-shaped members to bring said members into substantial parallel planes.

5. The herein described method of making multiple slide fasteners from a continuous wire blank which includes the steps of forming a series of regularly spaced projections along one side of the blank and two sets of regularly spaced projections along the opposite side of the blank with the projections thereof disposed opposite and in alternation respectively with the projections of said series and in substantially the same plane therewith, then bending the wire blank portions between successive projections of said series in the plane of the series of projections to form a succession of spaced substantially U-shaped fastener members lying in substantially the same plane with the projections of said series constituting coupling portions connecting the legs of the U-shaped members and with certain of the other projections connecting the extremities of the adjacent legs of successive U-shaped members, then forming complementary lateral projections and recesses on opposite sides respectively of the coupling portions of the U-shaped members, and then bending the blank portions which connect the successive U-shaped members to bring said members into substantial parallel planes.

MARTIN WINTERHALTER.